United States Patent

Fruhwirth et al.

[11] Patent Number: 5,570,755
[45] Date of Patent: Nov. 5, 1996

[54] SYSTEM FOR THE CONTROL OF THE COUPLINGS IN THE DRIVE TRAIN OF A MOTOR VEHICLE

[75] Inventors: Gerhard J. Frühwirth, Schönau; Johann Deinhofer, Peter in der Au; Franz Stelzeneder; Günter Pichlbauer, both of Steyr; Johann Hager, Bad Hall; Johan P. Reif, St. Wolfgang, all of Austria

[73] Assignee: Steyr-Daimler-Puch AG, Vienna, Austria

[21] Appl. No.: 292,818

[22] Filed: Aug. 10, 1994

[30] Foreign Application Priority Data

Aug. 16, 1993 [DE] Germany ............... 43 27 507.9

[51] Int. Cl.⁶ ......................................... B60K 17/34
[52] U.S. Cl. ............................ 180/249; 180/197
[58] Field of Search .................... 180/233, 249, 180/248, 197; 192/85 C

[56] References Cited

U.S. PATENT DOCUMENTS

| | | | |
|---|---|---|---|
| 5,119,900 | 6/1992 | Watanabe et al. | 180/247 |
| 5,275,254 | 1/1994 | Shiraishi et al. | 180/248 |
| 5,335,764 | 8/1994 | Leitner et al. | 192/85 C |
| 5,407,024 | 4/1995 | Watson et al. | 180/248 |
| 5,448,478 | 9/1995 | Eto | 180/233 |
| 5,450,919 | 9/1995 | Shitani | 180/247 |

FOREIGN PATENT DOCUMENTS 0510457  10/1992  European Pat. Off. .
3505455  7/1987  Germany .

OTHER PUBLICATIONS

"Ein elektronisch geregeltes 4-Rad-Antriebssystem zur Steigerung der aktiven Sicherheit", by A. Zomotor, H. Leiber, S. Neundorf, K. Richter, K. Büchle, Automobil-Industrie Jan. 1987, Antriebssystem, pp. 27-32.

Primary Examiner—Kevin T. Hurley
Attorney, Agent, or Firm—Meltzer, Lippe. Goldstein, et al.

[57] ABSTRACT

A system for the control of couplings in the locking mechanisms or differentials of a drive train in an all-wheel-drive vehicle is disclosed. The drive train of a vehicle having at least two drive axles (4×4 vehicle) comprises, starting from the engine and transmission block 1, a power take-off with switchable coupling 2, a front axle differential with locking coupling 3, a rear axle differential with locking coupling 5, steering angle sensor 10, rotational speed sensors 11, status sensors 12 and actuators 13, 14, 15. The rotational speed sensors 11 are installed in proximity to the wheels 4, 6. To be able to automatically switch all the couplings in keeping with terrain conditions, a control system 18 having individual modules (21,24,25) for each coupling (2,3,5) is provided. The control modules (24,25) of the hierarchically lower couplings (3,5) also emit control signals for one or several hierarchically higher coupling(s) (2,5) before they actuate their own couplings (3,5). The slip signals are slip totals signals formed by integration of the rotational speed differences and are compared with slip totals threshold values to obtain control signals with which the couplings are controlled.

25 Claims, 8 Drawing Sheets

FIG. I

SYSTEM FOR THE CONTROL OF THE COUPLINGS IN THE DRIVE TRAIN OF A MOTOR VEHICLE

FIELD OF THE INVENTION

The instant invention relates to a system for the automatic control of the couplings in the drive train of an all-wheel-drive off-the-road vehicle. Specifically, the invention relates to a system in which slip signals formed on the basis of rotational wheel speed signals, are compared with threshold values to produce control signals for the couplings.

BACKGROUND OF THE INVENTION

Off-the-road vehicles are vehicles with two or three or more driving axles. The performance profile of such vehicles is mainly designed for off-the-road travel. In these vehicles one of the axles, usually the front axle (or front axles, if more than one), can be driven either permanently or by being switched into line. Therefore, the corresponding coupling is employed either to switch the front axle drive into line or for locking the central differential. Furthermore, one coupling is provided in these vehicles for the locking of each axle differential in order to achieve full off-the-road capability. The couplings may be disk couplings, as well as positively engaging couplings. In heavy vehicles the latter are preferred because of the high torque to be transmitted and the limited availability of installation space.

Steering an all-wheel vehicle off the road is an art which consists not the least in the ability to take the correct action in the drive system depending on the driving conditions and the nature of the terrain. These actions include connecting the front axle drive and actuating the longitudinal (inter-axle) locking mechanism or differential and the transverse (intra-axle) locking mechanism or differential. For this reason, different actions are taken by the driver in known all-terrain vehicles. Therefore, individual switches, or at least one switch with several switching positions, are provided. A rigid sequence of actions must then be followed. However, this sequence of actions does not help the driver in judging the state of the vehicle and in selecting the drive mode.

Automatic locking differentials which lock dependently of the current rotational speed differences are also known. However, if several differentials are installed in series, a problem arises as described through the following example. Differentials installed in series include first a longitudinal inter-axle differential and then intra-axle differentials connected in the direction of torque flow.

If the right rear wheel slips in a vehicle having such a series differential arrangement, the action of the non-locked differentials causes all the rotational speeds in the drive train to change. The difference between the rotational speeds of the two rear wheels is greatest. The difference between the median rotational speeds on the front and rear wheels, i.e., the average produced by the axle differentials, is smaller. This difference in speeds leads to a locking of the rear axle differential which results in only one driving wheel being available which will easily lose road adherence since the right wheel is slipping. The longitudinal locking mechanism or differential is released only when it slips and three wheels are driving, insofar as the vehicle has not become mired by then. Furthermore, when the wheels of an axle are slipping, the danger that they may laterally push away exists.

The correct action in this situation is to lock the longitudinal differential first. But if the switching threshold of the longitudinal differential is put lower than that of the transverse differential, the longitudinal differential will be locked first. However, this will cause the rotational speed difference of the rear wheels to be reduced and the switching threshold for the locking of the rear axle transverse differential will no longer be attained.

If the vehicle is equipped with a connectable front wheel drive instead of a longitudinal locking mechanism, the above described effect becomes even more apparent. The individual rotational speed differences will depend on the switching state of the couplings. Because the switching state of the couplings depends on rotational speed differences while the rotational speed differences depend on the switching state, an erratic back and-forth switching will arise if individual clutches are automatically operated individually.

Furthermore, automatically locking differentials are as a rule locked, although usually only in part, by disk couplings which, aside from their known disadvantages, are subject to much greater wear under such conditions.

If the rotational speeds of all the wheels are taken into consideration in an automatic transmission and if these speeds are processed centrally, very complicated and intricate logical criteria are needed. However, these criteria are still unable to cover all possible situations. Since the rotational speeds of the wheels depend on the switched state of the individual couplings in this case too, the danger of undesirable switching still exists, particularly undesirable and dangerous switching back into the unlocked state.

A system is disclosed in DE-C 35 05 455 and the publication AUTMOBIL-INDUSTRIE 1/87 (pages 27 to 32, dealing with the 4-MATIC of MERCEDES-BENZ). This known system automatically actuates the connection of the front axle drive, the central locking mechanism and the rear-axle locking mechanism. However, its performance profile strongly emphasizes the requirements of a fast road vehicle and is geared for safety. It is basically different from a system designed for off-the-road travel. In this system, an automatically locking differential is provided for the rear axle. The control of the front axle coupling and the longitudinal differential is based only on the axle speeds. Furthermore, this known system is dependent on the smooth engagement of disk couplings because of the safety reasons mentioned earlier.

A control system for the control of individual couplings is disclosed, for example, in the assignee's EP-OS 510 457 (U.S. Pat. No. 5,335,764). In this system, for the control of a positively engaging coupling, with all of the applications mentioned above being possible, rotational speed differences are compared with threshold values. The special disclosed systems function with actuating elements that are simple in their action and require no uncoupling command, but automatically uncouple when the transmitted torque is small enough. The instant invention has the coordination of such individual systems as its object and is applicable to the systems described therein, but is in no way limited to them. It is also suitable for any positively engaging coupling controlled in any manner and even for disk couplings.

SUMMARY OF THE INVENTION

An object of the present invention is to provide an automatic control system which meets in every way the requirements for the operation even of heavy vehicles over difficult terrain.

This and other objects of the present invention are achieved by providing a system for automatic control of couplings in a drive train of an all-wheel-drive off-the-road vehicle having a transfer case constituting a power take-off for the front axle(s). The system has a plurality of drive axles, each of said plurality of drive axles having a pair of wheels connected thereto. A plurality of rotational speed sensors are associated with the wheels which produce rotational wheel speed signals indicative of the rotational speed of the wheels. A plurality of actuable couplings are associated with the transfer case and with the drive axles. The actuable couplings are arranged in a hierarchy of higher and lower couplings. A separate control module is dedicated to each of the actuable couplings. Each separate control module receives rotational wheel speed signals from the rotational speed sensors and produces control signals based thereon for actuation of the couplings. A control module dedicated to a lower coupling produces control signals which actuate at least one higher coupling before producing control signals which actuate its dedicated lower coupling. The control signals are produced by comparing slip total signals reflecting total slip of the wheels with slip total threshold values.

In another embodiment of the invention, the plurality of couplings include at least one coupling associated with each of the axles.

In another embodiment of the invention, a first rear axle drive, a connectable front axle drive, a coupling for connection of the connectable front axle drive, a front axle drive control module dedicated to the coupling for connection of the connectable front axle drive, a first transverse rear axle locking control module and a transverse front axle locking control module are provided. The coupling for the connection of the connectable front axle drive can be closed by its dedicated control module, by the first transverse rear axle locking control module and by the transverse front axle locking control module. The first transverse rear axle locking control module holds the coupling for connection of the front axle drive in engagement for a given period of time. Furthermore, a second rear axle drive, an inter-axle differential, an inter-axle locking coupling, a second rear axle transverse locking coupling, an inter-axle locking control module dedicated to the inter-axle locking mechanism coupling and a second transverse rear axle locking control module can be provided. The inter-axle locking coupling can be closed by its dedicated module, by the first and second transverse rear axle locking control modules, and by front axle drive control module. The first and second transverse rear axle locking control modules, the transverse front axle locking control module and the front axle drive control module hold the inter-axle locking coupling in engagement for a given period of time.

Further, a transverse front axle locking coupling and a transverse front axle locking control module dedicated to the transverse front axle locking coupling can be provided. The transverse front axle locking control module can only close the transverse front axle locking coupling.

In still another embodiment of the invention, a first rear axle drive, a permanently connected front axle with the transfer case having a longitudinal locking mechanism, a coupling for the longitudinal locking mechanism and couplings for the transverse locking of the front axle and of the rear axle, a longitudinal locking control module dedicated to the longitudinal locking coupling, a first transverse rear axle locking control module and a transverse front axle locking control module are provided. The coupling for the longitudinal locking mechanism can be closed by its dedicated control module, the first transverse rear axle locking control module and the transverse front axle locking control module. The first transverse rear axle locking control module and the transverse front axle locking control module hold the coupling of the longitudinal locking mechanism in engagement for a given period of time. Further, a second rear axle drive, an inter-axle differential, an inter-axle locking coupling, a second rear axle transverse locking coupling, an inter-axle locking control module dedicated to the inter-axle locking coupling and a second transverse rear axle locking control module can be provided. The inter-axle locking coupling can be closed by its dedicated module, the first and second transverse rear axle locking control modules and the longitudinal locking control module. The first and second transverse rear axle locking control modules, the transverse front axle locking control module and the longitudinal locking control module hold the inter-axle locking coupling in engagement for a given period of time.

Additionally, the first transverse rear axle locking coupling and the second transverse rear axle locking coupling are associated with a common module.

In another embodiment of the invention, a first rear axle drive, a front axle drive, a first transverse rear axle locking coupling, a transverse front axle locking coupling, a first transverse rear axle locking control module dedicated to the coupling for the first transverse rear axle locking mechanism and a transverse front axle locking control module are provided. The coupling for the first transverse rear axle locking mechanism can be closed by its dedicated control module and the transverse front axle locking module. The transverse front axle locking module holds the first transverse rear axle locking coupling in engagement for a given period of time.

In still another embodiment of the present invention, a system for automatic control of couplings in a drive train of an all-wheel-drive off-the-road vehicle is provided. The vehicle has a transfer case with a power take-off and a plurality of drive axles. Each of the plurality of drive axles has a pair of wheels connected thereto. A plurality of rotational speed sensors is associated with the wheels. These speed sensors produce rotational wheel speed signals indicative of the rotational speed of the wheels. A plurality of actuable couplings are associated with the transfer case and the drive axles. The actuable couplings are arranged in a hierarchy of higher and lower couplings. A control which controls each of said actuable couplings is provided. The control receives the rotational wheel speed signals from the rotational speed sensors and produces control signals based thereon for actuation of the couplings. In order to control a lower coupling, the control produces control signals which actuate at least one higher coupling before producing control signals which actuate the dedicated lower coupling. The control signals are produced by comparing slip total signals reflecting total slip of said wheels with slip total threshold values.

The objects of the present invention are achieved by providing a separate control module for each individual coupling. These control modules produce signals for the individual couplings. The system is decentralized. An intricate logic for the analysis of the rotational wheel speed signals is not needed. Depending on the design of the system, the individual modules are either program modules, i.e., if the system comprises a microprocessor, or hardware modules, i.e., if the system comprises hard-wired components. The hierarchical interconnection of the couplings is taken into account in the present invention. The control modules of the hierarchically lower couplings also transmit control signals to one or several hierarchically higher coupling(s) before they trigger their own coupling. This produces a "democratic hierarchy" and the different systems are able to intervene in another system before they actuate themselves.

However, in the case of highly changeable rotational speed differences, this hierarchy may not be sufficient because one disengagement may pass another in view of the final duration of engagement. Furthermore, in the case of a rotational wheel speed difference, i.e., sudden loss of ground adherence of one wheel during a steep climb, also known as "breaking out", timely shifting of a claw or positively engaging coupling may no longer be possible. Therefore, the slip signals are signals of total slip formed by the integration of the rotational speed differences. These total slip signals are compared with threshold total slip values. This means that the greater the rotational speed difference, the quicker the slip total threshold is reached. Consequently, switching is very rapid in the case of a great increase in rotational speed. If the increase in speed is slower or the lower rotational speed difference is low, switching takes place only after a longer period of time.

Furthermore, a correct evaluation based on advance-indication signs is possible due to the slip totals, even when the slip varies, and unnecessary switching is avoided. The slip total has the dimensions of an angle or an arc. Therefore, the switching thresholds can also be adapted to mechanical conditions, especially to the particularities of a claw or positively engaging coupling. Thus, it is also possible to ensure that the thresholds of the slip totals only take effect when they are run through in ascending order and that the holding function takes effect when the values to be added together decrease again.

The threshold values in the control modules of the hierarchically lower couplings for the engagement of hierarchically higher couplings are lower than for the engagement of their own couplings. During the actuation of a coupling and its holding function, the holding function ensures that the coupling remains engaged for a certain period of time. When the rotational speed difference between the rear wheels increases, the associated module first causes a locking of the longitudinal differential, since the threshold is lower than the one which causes transverse locking. The rotational speed difference between the rear wheels is processed in the module of the locking mechanism of the rear axle. However, provisions are also made for the transverse locking to remain engaged for a certain period of time, because this locking can lower the rotational speed difference to such an extent that a release of the rear axle locking mechanism does not occur at all. The period of time may also depend on the speed or the speed of change. If the engaged locking does not result in any decrease of rotational speed difference, the slip total will continue to climb and will reach the next threshold value for the release of the coupling. In this instance, the holding function ensures that no back-switching, i.e., renewed disengagement of the coupling, ensues.

If the invention is applied to a vehicle having a permanent rear axle drive and a connectable front axle drive, the coupling for the connection of the front axle drive can be locked by its associated module, by a rear axle transverse-locking module and by a transverse front axle locking module. The transverse rear axle locking module keeps the coupling for the connection of the front axle drive in engagement for a certain period of time.

If the invention is applied to a vehicle having a permanent rear axle driven and a front axle having a connectable longitudinal locking mechanism or differential, the coupling for the longitudinal locking mechanism can be locked by its own module, by a transverse rear axle locking module and by a transverse front axle locking module. The transverse rear axle locking module and the transverse front axle locking module retain the coupling for the connection of the front axle drive in engagement for a certain period of time.

The holding function according to the present invention decreases the switching frequency on the terrain in systems with controlled back-switching (according to any criteria whatsoever), as well as in systems with automatic back-switching through drop in torque, as in EP-OS 510 457, and in addition leads to a valuable gain in safety.

In a further embodiment of the invention, the coupling of the transverse rear axle locking mechanism can be locked by its associated module and by the module of the transverse front axle locking mechanism. The transverse front axle locking module holds the coupling of the transverse rear axle locking mechanism or differential in engagement for a certain period of time. Consequently, the slip of a front wheel does not immediately result in the locking of the front axle differential, which would impair the steerability of the vehicle. Instead, the transverse rear axle locking mechanism is actuated first, resulting in greater traction gain. The advantages of the holding function in this embodiment are the same as those mentioned above. For the same reason, the module of the transverse front axle locking mechanism is able to lock only its own coupling thereby ensuring that it is locked last in order to maintain steerability.

In another embodiment of the invention, a vehicle having two drive rear axles and an inter-axle locking mechanism is provided. Advantageously, the coupling of the inter-axle locking mechanism is lockable by its own module and by the transverse locking modules of the two rear axles. The longitudinal differential module, the transverse rear axle locking module and the transverse front axle locking module hold the coupling for the locking of the inter-axle differential in engagement for a certain period of time. This takes into account that the inter-axle locking mechanism is hierarchically higher than the transverse rear axle locking mechanism and the central locking mechanism. In a field test, it has further been shown that a staggered actuation of the two rear axle transverse locking mechanisms provides no further advantages as a rule. Therefore, it is a welcome simplification, that the two rear axle transverse locking mechanisms are associated with a common module.

Off-the-road vehicles are also driven on solid roads. For reasons of safety, the actuation of the transverse locking mechanism is advantageously inhibited. However, the modules are able to trigger a hierarchically higher locking action. The possible triggering of longitudinal locking as a result of transverse slip provides a considerable gain in safety which cannot be attained in any other manner.

In another embodiment of the invention, the front axle locking module can actuate the rear axle locking mechanism, as well as the central locking mechanism, by breaking through the hierarchy because the associated thresholds are lower in the central locking mechanism then in the front axle locking mechanism. If these threshold values are designed so that two couplings cannot be switched at the same time, the switching impact is decreased. In the in the case of electric or pneumatic actuation there is danger of an unacceptable slowing down of the engaging speed as a result of simultaneous power consumption by two actuators.

This can be ensured under all circumstances by connecting the switching actuators of these couplings in series as a redundant safety. The second actuator can only be actuated when the first one has already switched. The holding force is then already considerably lower. This also prevents actuation of a hierarchically lower locking mechanism to trigger a solenoid valve in case of malfunction in the control device or the cables without previous actuation of the higher locking mechanism.

By contrast with off-the-road passenger cars, it may be advantageous in heavy trucks to connect the axles for braking. The coupling for longitudinal locking, and possibly also the coupling of the inter-axle locking mechanism, are closed during braking for the longitudinal locking or connection of the front axle drive. As a result, different braking forces between the front axle and rear axle are equalized in such vehicles particularly in vehicles without ABS (anti-lock braking system). The blocking tendency of the individual axles is prevented by static or dynamic axle load shift. Overall, a gain in travel stability is achieved for as long as no transverse locking mechanism is triggered.

The control system also requires signals which indicate the switched state of individual couplings. These signals are normally received by sensors at the actuators. Defects in such actuators may cause delicate operational malfunctions and must, therefore, be recognized. In a further embodiment of the invention, signals indicating the switched state of individual couplings are acknowledged. These signals are formed from the rotational wheel speed signals. These signals are used either directly or for the control of other acknowledging signals.

Another safety function which makes it possible to continue travelling with defects, comprises closing the coupling for the longitudinal locking mechanism or for connection of the front axle drive and possibly also of the inter-axle locking mechanism. It has been shown that this state is better for vehicle stability and traction. Furthermore, a malfunction may occur while the vehicle is in the field and the vehicle can continue to operate.

In another embodiment, individual rotational wheel speed differences are compared with threshold values below which the rotational wheel speed differences are not taken into account to calculate the slip totals. The slip totals are used for calibration of the system. This prevents more than insignificant diameter differences of the tires from causing an actuation of a locking mechanism at any time and unexpectedly. Furthermore, a criterium for a regular state in which calibration can be carried out is thereby created.

In another embodiment of the invention, positively engaging couplings are used which are engaged by single-acting actuators and disengaged by spring force when the transmitted torque drops below a given value. Positively engaging couplings are very space-saving by comparison with disk couplings and are characterized by short shifting distances which can be covered very rapidly. The actuators can, thus, be designed very simply and without any delay elements. Control based on slip totals which causes a decrease in wear with disk couplings is especially favorable for positively engaging couplings because engagement of the coupling is ensured under all circumstances at the optimal differential rotational speed independent of the gradient of the differential speed. The simplification of control achieved by eliminating a disengagement control with its known problems is not only multiplied by the number of modules but simplifies the entire system to a degree going far beyond this.

In a further embodiment of the invention, it is possible for closed couplings to be held in their closed state during gear shifting in the main transmission. The holding function already provided can, thus, also be used to prevent unwanted opening of individual couplings during gear switching in the main transmission. For this reason it is recommended to install a contact on the coupling pedal which triggers the holding function with a positive coupling as soon and for as long as it is pushed down.

BRIEF DESCRIPTION OF THE DRAWINGS

The invention is described and explained in further detail below through the following drawings.

DETAILED DESCRIPTION OF THE INVENTION

Figure 1:
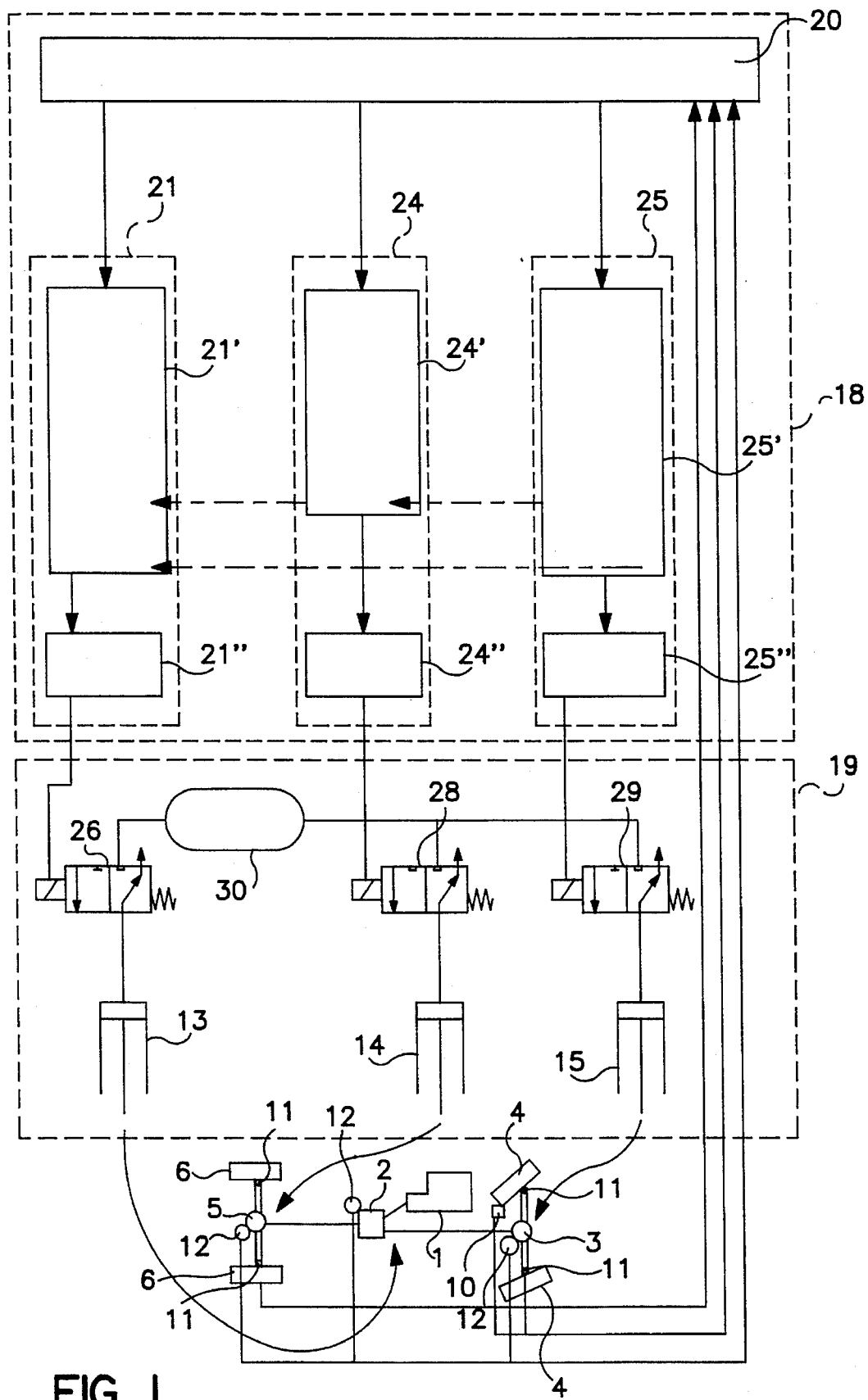
FIG. 1 shows a diagram for 4×4 vehicles.

FIG. 1 shows the drive train of a 4×4 vehicle having two driving axles. The drive train starting at the engine and transmission block 1, consists of a power take-off or transfer case with a longitudinal differential and switchable coupling 2, a front axle differential with locking coupling 3 and a rear axle differential with locking coupling 5. The front wheels are indicated by reference numbers 4 and the rear wheels are indicated by reference numbers 6. The switchable coupling 2 of the power take-off serves either to connect the front axle drive or to lock the longitudinal differential of the power take-off. No distinction between these will be made below unless mentioned especially, because the effect is absolutely similar.

The drive train furthermore comprises sensors 10,11,12 and actuators 13,14,15. Sensor 10 is a steering angle sensor. Sensors 11 are, in this case, rotational-speed sensors located near the front and rear wheels 4, 6. However, because the transmission ratios are known, these speed sensors 11 may also be located at the input or output of the individual transmissions or anywhere else. Sensors 12 are status sensors for the switched position of the individual elements, such as the actuator, coupling, brake pedal, etc. They are not necessary for the switched position of the actuators because the status of the actuators can also be ascertained by other means. The actuators 13,14,15 are mounted on the couplings 2,3,5, respectively, which they actuate. In the case of pneumatic actuation, the actuators 13, 14, 15 are air pressure cylinders, which are shown greatly enlarged in the drawing. Arrows indicate the actual location of the actuators: actuator 13 on the power take-off, actuator 14 on the rear axle differential, and actuator 15 on the front axle differential. The control system consists of a control device 18 and the actuation control 19. In the control device 18 it is possible to distinguish, although not necessarily topographically, between a data collection part 20 and the modules 21,24,25. The modules 21, 24, 25 each respectively comprises a computing part 21',24',25' and a memory part 21",24",25". The slip-dependent decisions are made and implemented in the computing portions 21',24',25' and safety controls, e.g., no engagement of the transverse locking differentials beyond a given travelling speed, are stored in the memory parts 21",24",25". The modules 21,24,25 supply the electric control signals for the solenoid valves 26,28,29, which in the simplest case may be two-position valves. The solenoid valves 26,28,29 control the supply of compressed air from a reservoir 30 to the actuators 13,14,15.

Figure 2:
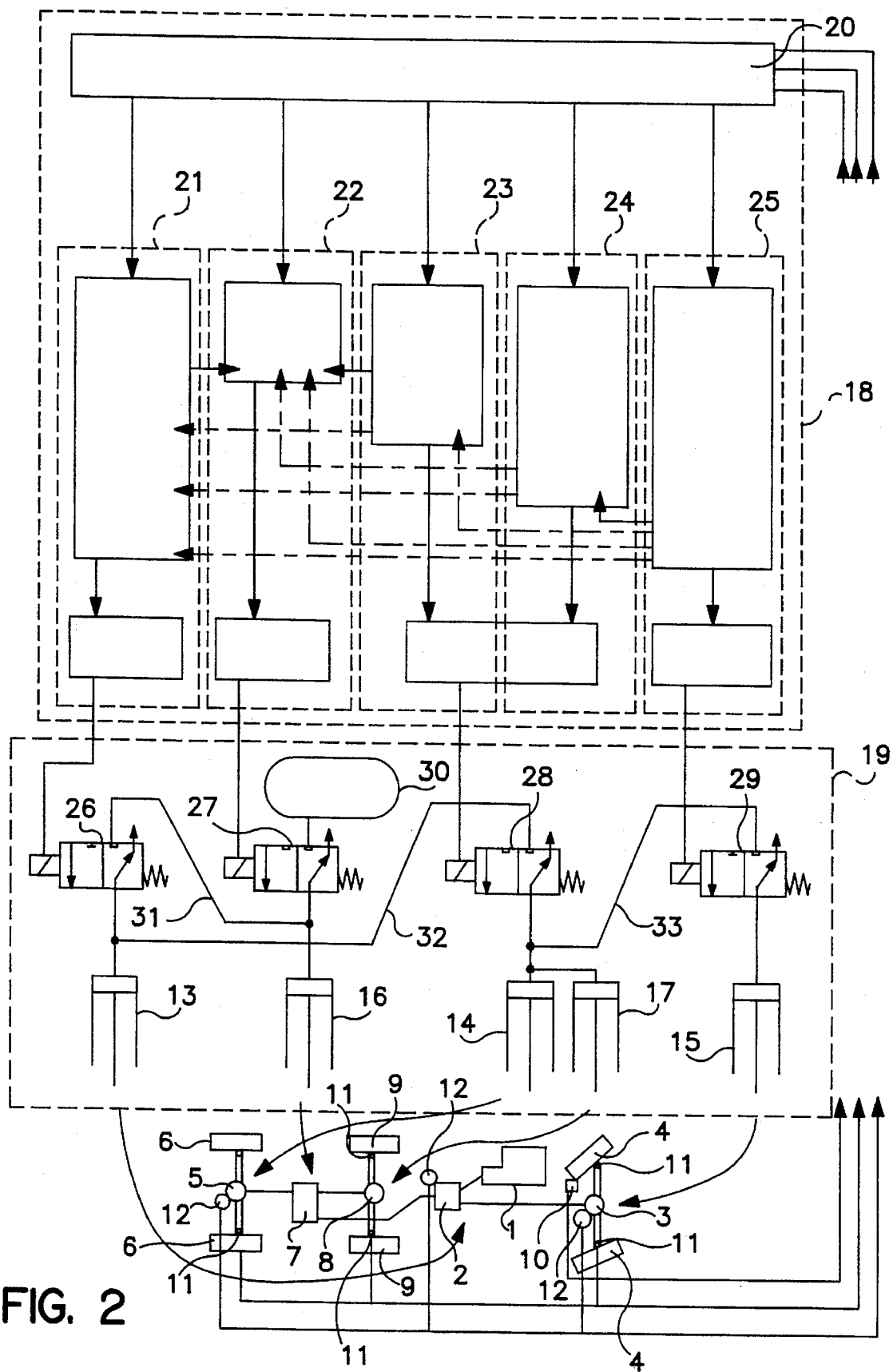
FIG. 2 shows a diagram for 6×6 vehicles.

FIG. 2 shows a variant for vehicles with three driving axles in which the same parts are given the same reference numbers. The additional parts are an inter-axle differential with locking coupling 7, a second rear axle differential with locking coupling 8, actuators 16,17 and two additional rear wheels 9. The control module 18 contains two additional modules: the inter-axle locking module 22 and the second transverse rear axle locking module 23.

Furthermore, a control valve 27 for actuator 16 for the inter-axle locking mechanism has been added. The actuators 14 and 17 are controlled by a common solenoid valve 28. If the front axle differential with locking coupling 3, actuator 15, solenoid valve 29 and module 25 were left out, a 6×4 vehicle would result to which the invention can also be applied.

A further difference exists between FIGS. 1 and 2. In the system of FIG. 1, the actuators 13, 14, 15 are supplied through parallel air conduits from reservoir 30. Such an arrangement could cause a switching delay in the case of simultaneous actuation of several actuators when the volume in the reservoir is low. Therefore, the arrangement in FIG. 2 is as follows: the compressed-air supply conduit 31 for the solenoid valve 26 and the longitudinal locking mechanism bifurcate only downstream of the solenoid 27 for the inter-axle locking mechanism; the compressed-air supply conduit 32 for the solenoid valve 28 of the transverse rear axle locking mechanism bifurcates only downstream of the solenoid valve 26 of the longitudinal locking mechanism; and the conduit 33 going to the solenoid valve 29 of the front axle locking mechanism bifurcates only downstream of the solenoid valve 28 of the rear axle locking mechanism.

When electromagnetic actuators are used, this arrangement can be repeated by means of appropriate electrical switches. Therefore, not only is simultaneous actuation of two couplings excluded but a redundant protection of the hierarchy of the locking mechanisms is created.

This hierarchy of the locking mechanisms is derived from the travel-dynamic effect of the individual locking mechanisms. Therefore, as in any hierarchy, certain locking mechanisms have more influence than others, meaning that direct influence on the travel dynamics, as well as indirect influence on the other locking mechanisms, occurs. If the hierarchy is not taken into account, an erratic back-and-forth switching of the individual locking mechanisms occurs. If the hierarchy is too rigid, the locking mechanisms do not fully use their influence. In trucks, the hierarchy, starting from the top, is the inter-axle locking mechanism, if the truck is 6×6, then a longitudinal locking mechanism or connection of the front axle drive, the transverse rear axle locking mechanism and, finally, the transverse front axle locking mechanism. This hierarchy is used, among other reasons, in order to impair the steerability of the vehicle as little as possible.

Figure 3:
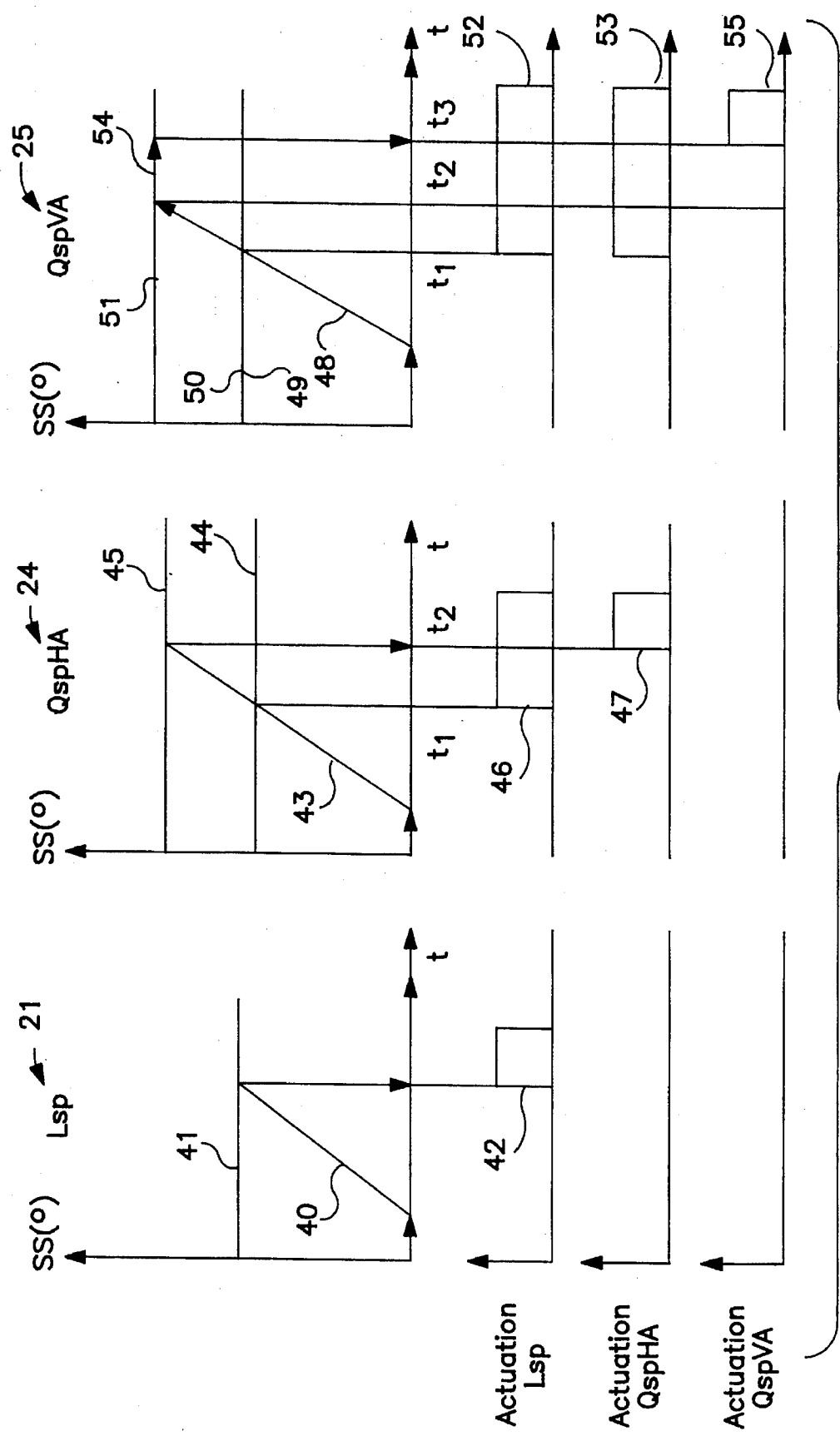
FIG. 3 shows a time diagram of the connecting conditions for 4×4 vehicles.

FIG. 3 schematically shows the actuation of the couplings 2,3,5 of FIG. 1 over time through the corresponding modules as a function of slip. The figure has the modules arranged as follows, from left to right: module 21 of the longitudinal locking mechanism, module 24 of the transverse rear axle locking mechanism and module 25 of the transverse front axle locking mechanism. Additional switching criteria have been left off for the time being. In module 21, a slip is calculated from the rotational wheel speed signals of the sensors 11 or, more precisely, a rotational speed difference is calculated from the difference between the mean values of the rotational speeds of the front wheels 4 and the rear wheels 6, taking into account the steering angle. From this rotational speed difference a slip total is formed by integration or addition.

In the uppermost diagram on the left side, the slip total having the physical dimension of an angle is entered on the ordinate and the time is entered on the abscissa. A constant rotational speed difference is represented by an ascending straight line 40 which reaches the slip total threshold 41 as predetermined for longitudinal locking (SSS_LSpVG). The steeper line 40 is, the faster it reaches the threshold 41. As a result, the control signal for the engagement of the locking coupling is transmitted at the power take-off 2 to the solenoid valve 26. It is then held back for a predetermined time (approximately 2 seconds), during which time back-switching is prevented. This is indicated in the curve entitled triggering LSP by rectangular signal 42, wherein LSP refers to the longitudinal locking mechanism.

In module 24 of the transverse rear axle locking mechanism, a slip is calculated from rotational wheel speed signals of the sensors 11, or, more precisely, a rotational speed difference is calculated from the difference between the rotational speeds of the rear wheels 6. From this rotational speed difference, a slip total, represented by an ascending straight line 43 in the case of constant slip, is again obtained by integration or addition. However, in this case, two thresholds apply to the slip totals, a first threshold 44 (SSS_LSpVG_by_QSpHA) and a second threshold 45 (SSS_QSpHA_by_QSpHA or in short SSS_QSpHA). In the transverse rear axle locking module 24, a threshold 44 for the actuation of a coupling 2 without the longitudinal locking module 21 is below the threshold 45 for the actuation of the transverse locking coupling 5. This longitudinal locking mechanism is reached at the point in time $t_1$. The longitudinal locking mechanism is triggered and held for a predetermined period of time, as shown by rectangular signal 46, which means in this case at the minimum that a disengagement of the longitudinal locking mechanism is impossible for the predetermined period of time. If this does not reduce the slip at the rear wheels, the slip total continues to increase until the threshold 45 is reached at time $t_2$. Now the transverse rear axle locking mechanism 5 is triggered, as shown by rectangular signal 47. However, the slip is often already reduced by the longitudinal locking mechanism 2 to such an extent that the transverse locking mechanism 5 is not even triggered. In that case, the longitudinal locking mechanism was not engaged by its module but by the transverse locking module.

Module 25 for the transverse front axle locking mechanism 3 uses the rotational-speed difference between the front wheels 4 to calculate a slip total. The slip total is represented by a straight line 48 which intersects three slip-total thresholds. Threshold 49, when reached, results in the longitudinal locking mechanism (SSS_LSp_by_QSpVA) being connected. Then threshold 50 is intersected which in this case equals the preceding threshold 49, (SSS_QSpHA_by_QSpVA). The corresponding actuations are again indicated below by the rectangular signals 52,53,55. The signals 52,53 are again maintained for a certain period of time. In addition a dead time 54 is provided, so that the actuation of the transverse front axle locking mechanism takes place only after a certain period of time in order to maintain the steerability of the vehicle. The steerability could also be achieved by an even higher threshold for as long as possible.

All the slip-total thresholds, which shall be designated hereinafter comprehensively by SSS_* (the thresholds of non-module couplings as SSS_*_by_*), may be constants or may also be rotational-speed-dependent variables. The variables could be selected differently depending on the chosen gear or depending on whether the vehicle is in traction mode (engine drives) or thrust mode (engine brakes).

Figure 4:
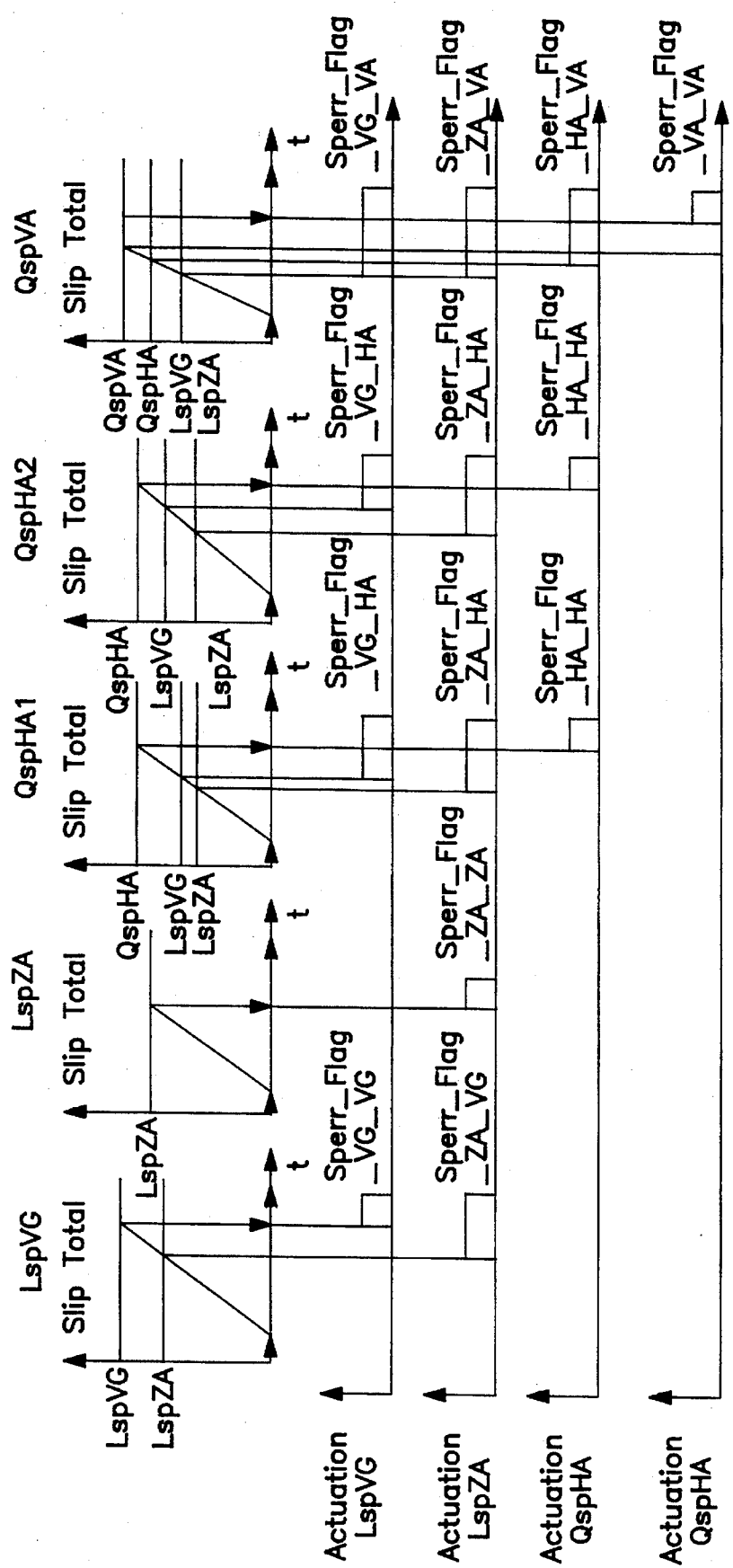
FIG. 4 shows a time diagram of the connecting conditions for 6×6 vehicles.

The time diagram of FIG. 4 is for a 6×6 vehicle and has the following additional elements: module 22 for the locking mechanism of the inter-axle differential 7 and module 23 for the locking mechanism of the second transverse rear axle differential 8. The course of events shown in FIG. 4 is analogous to FIG. 3 and takes into account the fact that the intra-axle locking mechanism 7 is the highest in the hierarchy. In anticipation of FIG. 5 the designations of the flags which lead to the activation of the locking mechanisms according to the program are also entered in FIG. 4.

Figure 5A:
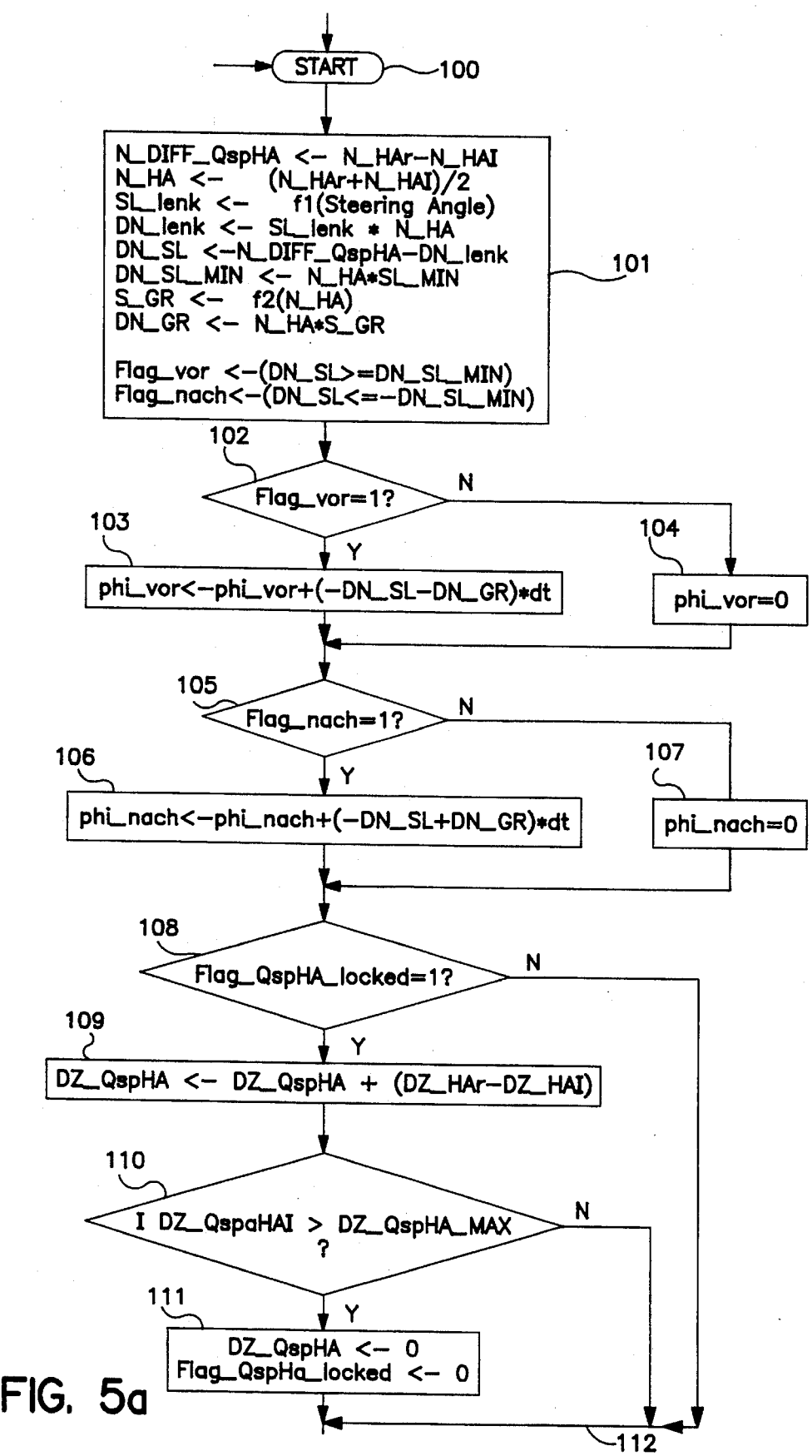
FIG. 5 shows a course-of-events diagram for the control unit of the transverse rear axle locking mechanism.
Figure 5B:
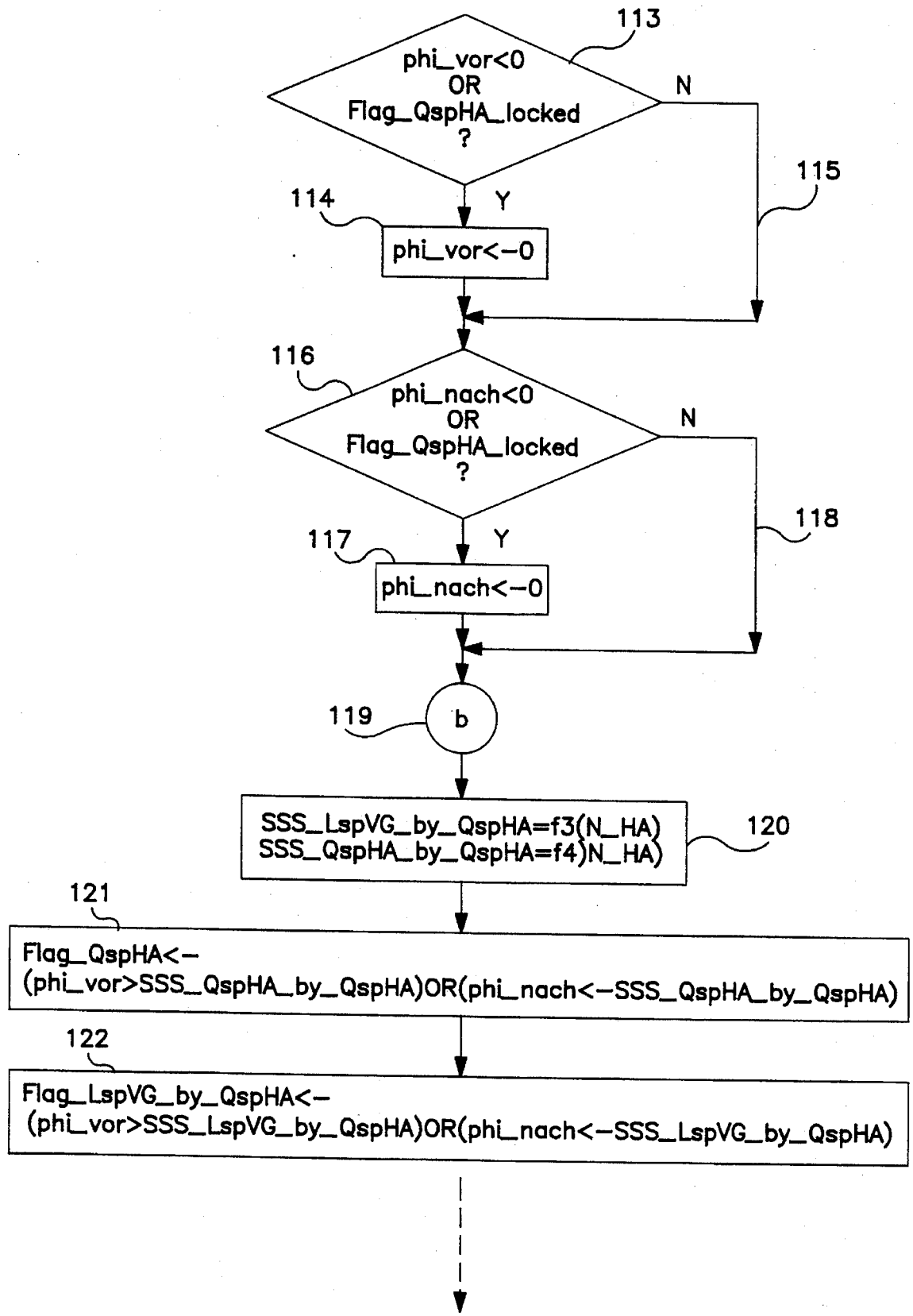
Figure 5C:
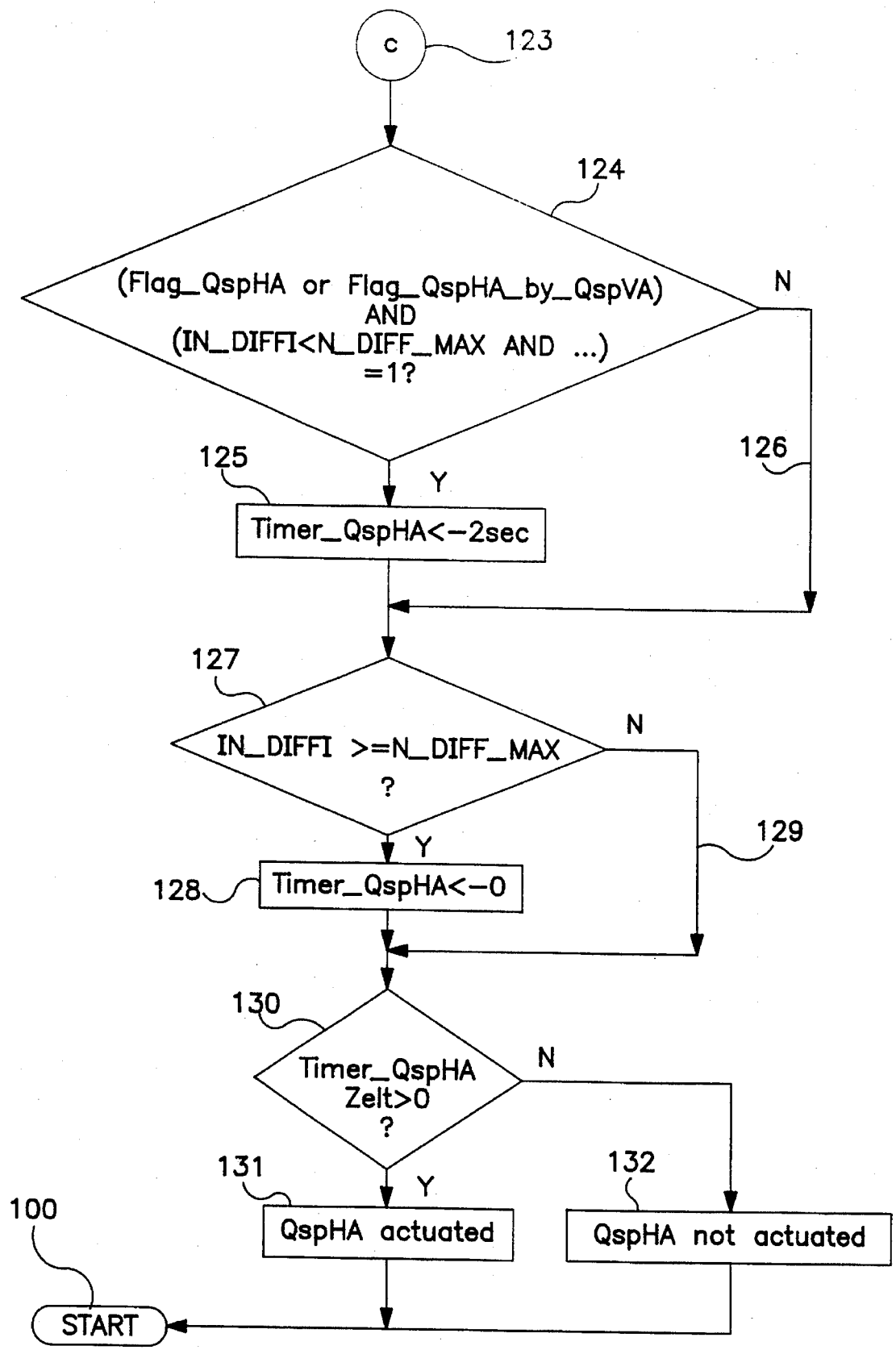
Figure 6:
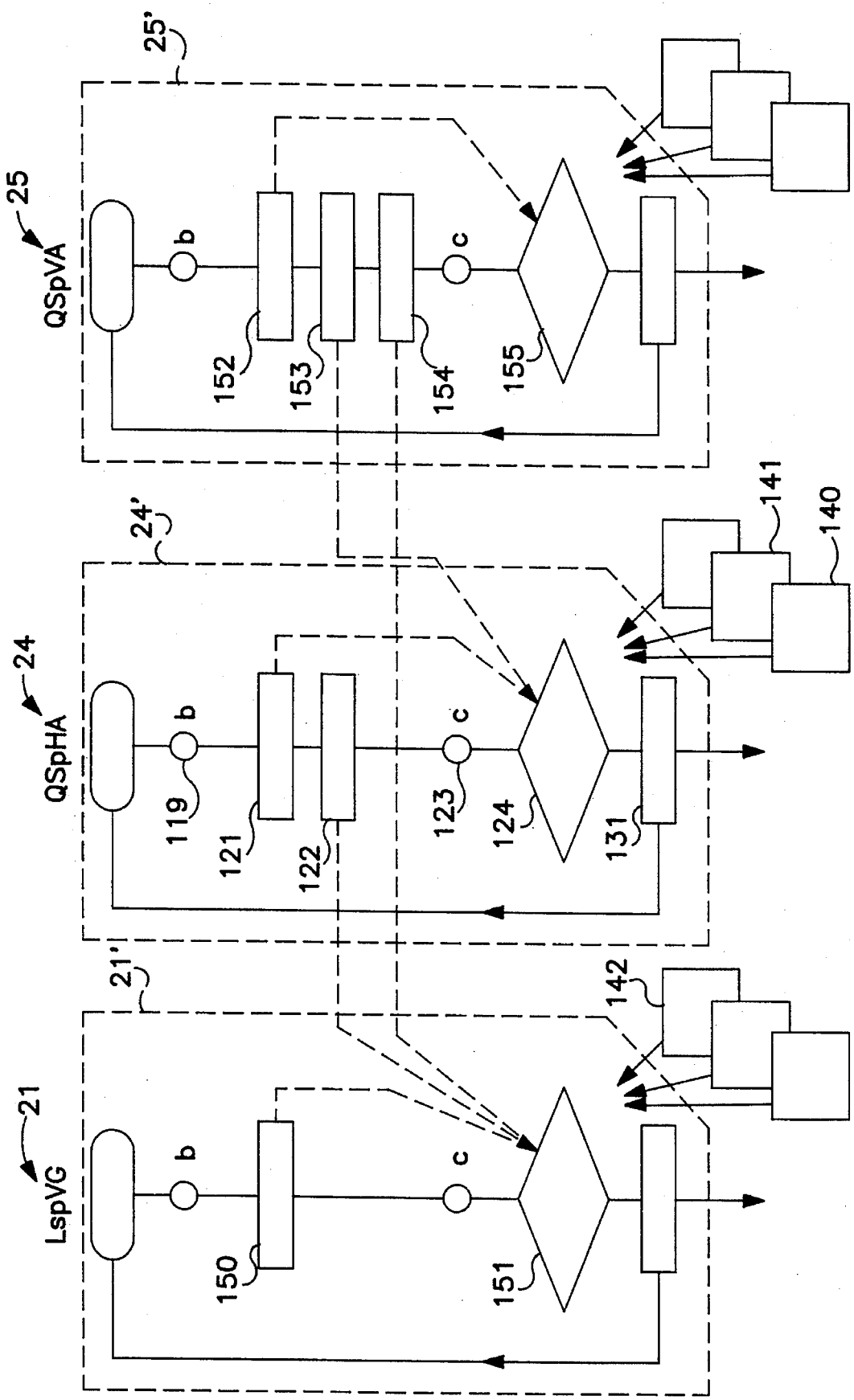
FIG. 6 shows an overview diagram which represents the course of events in the entire control unit.

FIG. 5 shows as an example the repetitive implementation of the program in the computing part 24' of module 24 of coupling 5 of the transverse rear axle locking mechanism, starting with the START field 100. In the formulas, the value attribution of a variable is designated by "<—" and the following designations are used:

| | |
|---|---|
| N_DIFF_QSpHA | Difference between the rotational speeds of the two rear wheels; |
| N_HAR | Rotational speed of the right rear wheel; |
| N_HA1 | Rotational speed of the left rear wheel; |
| N_HA | Mean rotational speed of the rear wheels; |
| SL_Lenk | Slip caused by the steering angle (slip is the rotational speed difference rendered dimension-less by one rotational speed); |
| DN_Lenk | Difference in rotational speed caused by the steering angle; |
| DN_SL | Dynamic rotational-speed difference; |
| DN_SL_MIN | Lower threshold of the dynamic rotational-speed difference below which rotational-speed differences are not taken into account; |
| SL_MIN | Lower threshold of the dynamic slip below which rotational-speed differences are not taken into account; |
| S_GR | Tire-specific limit slip depending on the transmitted torque, is taken from a function table f2; |
| DN_GR | Appertaining limit value of the rotational difference speed; |
| FLAG_vor(before) | Marker which is set when the slip is leading (traction slip); |
| FLAG_nach(after) | Marker which is set when the slip is trailing (thrusting slip). |

In field 101, all these magnitudes are used to define the flags for traction or thrusting slip. In fields 102,105 the decision is made whether traction or thrusting slip has occurred or whether the differential rotational speed is below the threshold DN_SL_MIN. For a traction slip, a traction slip total phi_vor(before) is added up and in field 107 a thrusting slip total phi_nach(after) is set equal to zero. For a thrusting slip, the thrusting slip total phi nach(after) is added up in field 106 and the traction slip total phi_vor(before) is set equal to zero in field 104. When the differential rotational speed is below the threshold DL_SL_MIN, both slip totals are set equal to zero in the fields 104,107 causing the entire program to be repeated without external effect, as described below.

In field 108, the program asks whether the marker Flag_QSpHA_locked is still set according to the previous passage. In field 109 the differential rotational speed is added up. A control is then made in field 110 as to whether the angle of rotation has been reached at which it is possible to be certain that either the locking mechanism is open or that the axle is broken. If yes (Y) the angle has been reached, the locking mechanism is open and the total zero is set in field 111 so that a new addition can be started with the next passage. If the locking mechanism is already open (N) in field 108, the fields 109, 110, 111 are circumvented along path 112.

If the locking mechanism is open according to field 108 or field 111, the slip totals phi_vor(before) and phi_nach(after) are set to zero in fields 113 to 117 and an advance indication limitation is carried out because the slip thresholds can be determined as a function of advance indications and it is necessary to make certain that the slip total curves 43 do not change their quadrant, or in other words, that phi_vor(before)>0 and phi_nach(after)<0 (fields 114,117). The round field 119 only serves for orientation. In field 120 the following slip-total thresholds are taken from functions tables f3 and f4 (they depend in this case on the rotational speed of the rear axle):

| | |
|---|---|
| SSS_LSpVG_by_QSpHA | Slip-total threshold in the transverse rear axle locking mechanism module for actuation of the longitudinal locking mechanism; |
| SSS_QSPHA_by_QSpHA | Slip-total threshold in the transverse rear axle locking mechanism module for the actuation of the transverse rear axle locking mechanism (the SSS_QSPHA for short). |

In field 121 the marker for the release of the transverse locking mechanism and in field 122 the markers for the release of the longitudinal locking mechanism are set when the slip total phi_vor or phi_nach(after) exceeds the applicable slip-total threshold.

| | |
|---|---|
| Flag_QSpHA | Markers for the release of the transverse rear axle locking mechanism; |
| Flag_LSpVG_BY_QSpHA | Markers for the release of the longitudinal locking mechanism by the module of the transverse rear-axle locking mechanism. |

Field 123 is again used for orientation. In field 124 the markers, including those of other modules, are read out and the rotational speed differences of field 101 are subjected to a safety control.

The rotational speed difference may not be too great at the switch of a claw coupling. When this control is passed (Y) the program goes through the timer in field 125 which carries out the holding function. Upon further controls in fields 127, 128, the timer 130 decides whether the actuation signal is to be given in field 131 (Y) or not (N) in field 132. From there the program returns to the starting field 100.

The program portion of FIG. 5 is related to the analog program portions of module 21 (longitudinal locking mechanism) and module 25 (transverse front axle locking mechanism). In module 21, the markers (Flag_LSpVG) are set in field 150 for the actuation of the longitudinal locking mechanism. Three markers, Flag_QSpVA in field 152, Flag_QSpHA_by_QSpVA in field 153 and Flag_LSpVG_by_QSpVA, can be set in module 25 in field 154. All these markers are accessible from all three modules and they are queried in module 21 in field 151, in module 24 in field 124 and in module 25 in field 155.

The signals which are thus produced now go into the testing or securing portions 21",24",25" and then to the solenoid valves 26,28,29.

Additional release criteria may be provided for as indicted by the fields 140,141,142. Thus, field 140 may cause the coupling (2) for the longitudinal locking mechanism or the connection of the front axle drive and possibly also the coupling (7) of the inter-axle locking mechanism to be closed during braking. Furthermore, field 141 can prevent a closed coupling (2,3,5;2,3,5,7,8) from opening during gear shifting in the main transmission (1). Finally, field 142 can ensure that in case of malfunction of one of the rotational-speed sensors (11) or of a steering-angle sensor (10) the coupling (2) of the longitudinal locking mechanism and, possibly, also the coupling (7) be closed for longitudinal locking or connection of the front axle drive.

While the invention has been described by reference to specific embodiments, this was for purposes of illustration only. Numerous alternative embodiments will be apparent to those skilled in the art and are considered to be within the scope of the invention.

We claim:

1. A system for automatic control of couplings in a drive train of an all-wheel-drive off-the-road vehicle, comprising, a transfer case constituting a power take-off, a plurality of drive axles, each of said plurality of drive axles having a pair of wheels connected thereto, a plurality of rotational speed sensors associated with said wheels which produce rotational wheel speed signals indicative of the rotational speed of said wheels, a plurality of actuable couplings associated with said transfer case and said drive axles, said actuable couplings being arranged in a hierarchy of higher and lower couplings, a separate control module dedicated to each of said actuable couplings, each separate control module containing slip total threshold values associated with each of said couplings in said hierarchy receiving said rotational wheel speed signals from said rotational speed sensors, and producing slip total signals reflecting total slip of said wheels and control signals based thereon for actuation of said couplings, wherein a control module dedicated to a lower coupling produces control signals which actuate at least a higher coupling in said hierarchy before producing control signals which actuate said dedicated lower coupling, and wherein said control signals are produced by said control module dedicated to said lower coupling by comparing said slip total signals reflecting said total slip of said wheels with said slip total threshold values.

2. The system of claim 1, wherein said plurality of couplings includes at least one coupling associated with each of said axles.

3. The system of claim 1, wherein said slip total threshold values contained within each of said separate control modules for engagement of said higher couplings are lower than said slip total threshold values for engagement of said lower couplings, and wherein each of said separate control modules produces control signals to actuate said higher and lower couplings after said slip total threshold values have been reached and followed by a time delay thereby ensuring that said higher couplings remain engaged for a given period of time.

4. The system of claim 3, wherein said plurality of axles comprises a first rear axle drive and a connectable front axle drive, said plurality of couplings comprises a coupling for connection of said connectable front axle drive, said separate control modules comprise a front axle drive control module dedicated to said coupling for connection of said connectable front axle drive, a first transverse rear axle locking control module and a transverse front axle locking control module, said coupling for connection of the connectable front axle drive can be closed by said control module dedicated to said coupling for connection of the connectable front axle, by said first transverse rear axle locking control module or by said transverse front axle locking control module, and said first transverse rear axle locking control module holds said coupling for connection of said front axle drive in engagement for a given period of time.

5. The system of claim 3, wherein said plurality of axles comprises a first rear axle drive and a permanently connected from axle drive, and the transfer case having a longitudinal locking mechanism, said plurality of couplings comprises a coupling for said longitudinal locking mechanism, and couplings for transverse locking of the front axle and of the rear axle, said separate control modules comprise a longitudinal locking control module dedicated to said longitudinal locking coupling, a first transverse rear axle locking control module and a transverse front axle locking control module, said coupling for said longitudinal locking mechanism can be closed by said longitudinal locking control module, by said first transverse rear axle locking control module or by said transverse front axle locking control module, and said first transverse rear axle locking control module and said transverse front axle locking control module hold said coupling of the longitudinal locking mechanism in engagement for a given period of time.

6. The system of claim 3, wherein said plurality of axles comprises a first rear axle drive and a front axle drive, said plurality of couplings comprises a first transverse rear axle locking coupling and transverse front axle locking coupling, said separate control modules comprise a first transverse rear axle locking control module dedicated to said coupling for said first transverse rear axle locking mechanism and a transverse front axle locking control module, said coupling for said first transverse rear axle locking mechanism can be closed by its dedicated control module and said transverse front axle locking module, and said transverse front axle locking module holds said first transverse rear axle locking coupling in engagement for a given period of time.

7. The system of claim 3, wherein said plurality of couplings comprises a transverse front axle locking coupling, and said separate control modules comprise a transverse front axle locking control module dedicated to said transverse front axle locking coupling, wherein said transverse front axle locking control module can only close its dedicated coupling.

8. The system of claim 4, wherein said plurality of axles further comprises a second rear axle drive and an inter-axle differential, said plurality of couplings further comprises an inter-axle locking coupling and a second rear axle transverse locking coupling, said separate control modules further comprise an inter-axle locking control module dedicated to said inter-axle locking coupling and a second transverse rear axle locking control module, said inter-axle locking coupling can be closed by its dedicated module, by said first and second transverse rear axle locking control modules and by said front axle drive control module, and said first and second transverse rear axle locking control modules, said transverse front axle locking control module and said front axle drive control module hold said inter-axle locking coupling in engagement for a given period of time.

9. The system of claim 8, wherein said first and second transverse rear axle locking couplings are associated with a common module.

10. The system of claim 3, wherein said couplings of said first transverse rear axle locking mechanism and said transverse front axle locking mechanism cannot be closed beyond a certain speed and said first transverse rear axle module and said transverse front axle module can close a coupling which is higher than said coupling of said first transverse rear axle locking mechanism and said coupling of said front axle locking mechanism in said hierarchy of higher and lower couplings.

11. The system of claim 3, wherein said slip total threshold values are at such levels that said higher and lower couplings cannot be engaged simultaneously.

12. The system of claim 11, further comprising a plurality of actuators individually connected to said plurality of couplings, wherein said actuators are serially connected to each other in order to constitute redundant safety.

13. The system of claim 6, wherein said coupling of the connection of the connectable from axle drive is closed during braking.

14. The system of claim 1, further comprising status sensors connected to one or more of said plurality of couplings and producing acknowledgment signals indicating whether individual couplings are engaged, and said acknowledgment signals are used in said control modules for verifying whether said individual couplings are engaged.

15. The system of claim 1, wherein said acknowledgment signals are produced based on said rotational speeds of said wheels.

16. The system of claim 4, further comprising a steering angle sensor connected to said front axle drive, and wherein said coupling for connection of the front axle drive is closed when one of said rotational-speed sensors or said steering-angle sensor fails.

17. The system of claim 1, wherein individual rotational wheel speed differences are compared with threshold values below which the individual rotational speed differences are not taken into account when calculating said slip totals and said individual rotational speed differences are used for calibration of signals for said steering angle sensor.

18. The system of claim 1, further comprising single acting actuators associated with each one of said plurality of couplings and wherein said plurality of couplings comprises positively engaging couplings engaged by said singleacting actuators and disengaged by a spring force.

19. The system of claim 1, wherein a closed coupling is held in a closed state during a gear shifting operation.

20. The system of claim 5, wherein said plurality of axles further comprises a second rear axle drive and an inter-axle differential, said plurality of couplings further comprises an inter-axle locking coupling and a second rear axle transverse locking coupling, said separate control modules further comprise an inter-axle locking control module dedicated to said inter-axle locking coupling and a second transverse rear axle locking control module, said inter-axle locking coupling can be closed by its dedicated module, by said first and second transverse rear axle locking control modules and by said longitudinal locking control module, and said first and second transverse rear axle locking control modules, said transverse front axle locking control module and said longitudinal locking control module hold said inter-axle locking coupling in engagement for a given period of time.

21. The system of claim 20, wherein said couplings of said first and second transverse rear axle locking couplings are associated with a common module.

22. The system of claim 6, wherein said coupling for said longitudinal locking mechanism, and possibly also the coupling of the inter-axle locking mechanism, are closed during braking.

23. The system of claim 5, further comprising steering angle sensors connected to said front axle drive and wherein said longitudinal locking coupling, and possibly also the inter-axle locking coupling, are closed when one of said rotational-speed sensors and said steering-angle sensor fails.

24. A system for automatic control of couplings in a drive train of an all-wheel-drive off-the-road vehicle, comprising, a transfer case constituting a power take-off, a plurality of drive axles, each of said plurality of drive axles having a pair of wheels connected thereto, a plurality of rotational speed sensors associated with said wheels which produce rotational wheel speed signals indicative of the rotational speed of said wheels, a plurality of actuable couplings associated with said transfer case and said drive axles, said actuable couplings being arranged in a hierarchy of higher and lower couplings, a control which controls each of said actuable couplings, the control containing slip total threshold values associated with each of said higher and lower couplings in said hierarchy, receiving said rotational wheel speed signals from said rotational speed sensors, and producing slip total signals reflecting total slip of said wheels and control signals based thereon for actuation of said couplings, wherein to control a lower coupling, the control produces control signals which actuate at least a higher coupling in said hierarchy before producing control signals which actuate a lower coupling in said hierarchy, and wherein said control signals are produced by said control by comparing said slip total signals reflecting said total slip of said wheels with said slip total threshold values.

25. The system of claim 24, wherein said control comprises separate control modules dedicated to each of said actuable couplings.

* * * * *